(No Model.)
J. AUSTIN.
BOILER FEEDER.
No. 532,998. Patented Jan. 22, 1895.
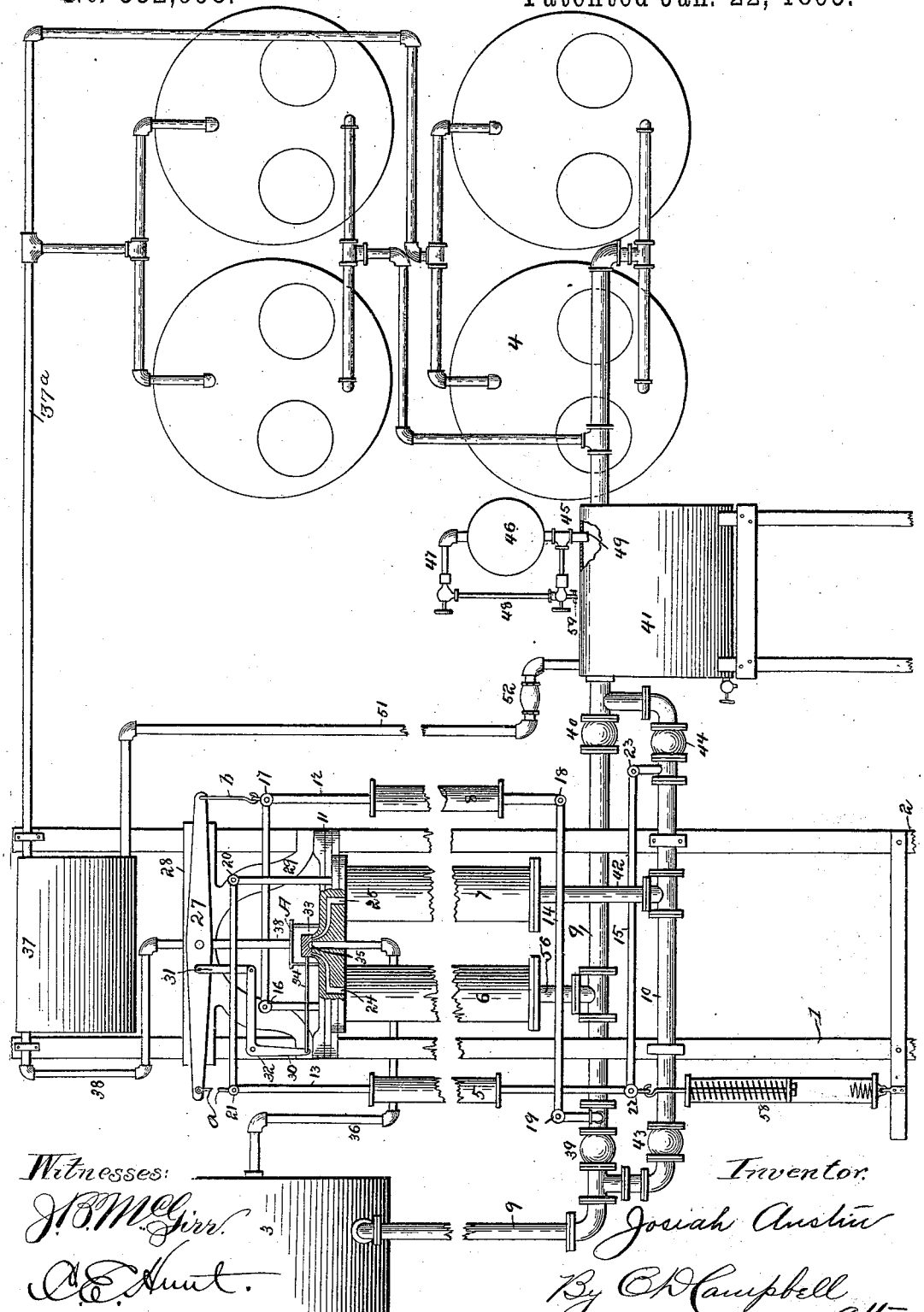
Witnesses:
J. B. McGirr.
A. E. Hunt.
Inventor.
Josiah Austin
By C. H. Campbell
Atty.

UNITED STATES PATENT OFFICE.

JOSIAH AUSTIN, OF BELLEFONTAINE, OHIO.

BOILER-FEEDER.

SPECIFICATION forming part of Letters Patent No. 532,998, dated January 22, 1895.

Application filed January 23, 1892. Serial No. 419,082. (No model.)

*To all whom it may concern:*

Be it known that I, JOSIAH AUSTIN, a citizen of the United States, and a resident of Bellefontaine, in the county of Logan and State of Ohio, have invented a certain new and useful Improvement in Boiler-Feeders, of which the following is a specification.

My invention relates to improvements in water feeders for boilers whereby the water is always kept at the same level in the boiler by the feeders which operate automatically, and my invention consists in mounting upon a suitable support, a series of feeders, connected together in pairs, one feeder of each pair being movably secured to a suitable means whereby as the said feeders are alternately moved up and down the water is alternately forced from the series of feeders into the boiler, and my invention further consists of certain novel features of construction as will be hereinafter fully described with reference to the accompanying drawing and specifically pointed out in the claims.

The accompanying drawing represents an elevation of my feeder, parts of which are shown in longitudinal section.

Referring to the drawing:—1 and 2 are uprights of a suitable framework which carry a set of steam and water pipes.

3 represents the water supply which has a gravitating head of water, and is connected with the boiler 4 by means of the pipes 9 and 10.

5, 6, 7, and 8, represent the feeders which are supported on the framework and which are connected with the water pipes 9 and 10 by the pipes 14, 15, 42 and 56. The feeders 6 and 7 are immovably mounted on the framework and are supported at their upper ends by the cross-piece 11, and at their lower ends by the pipes 56 and 42. The feeders 5 and 8 are movably mounted on the framework by means of the walking beam 27 which is pivoted on the cross-piece 28 of the bracket 29, and to which they are connected by means of the links $a$ and $b$. These feeders are connected together in pairs, the feeders 5 and 7 being connected by the pipe 13, and the feeders 6 and 8 by the pipe 12. The feeders 5 and 8 serve as regulators for the feeders 6 and 7 and are placed on a center.

16, 17, 18 and 19 are joints made in the pipes 12 and 14 of the feeder 8 which permit of the feeder being moved in a vertical direction, and 20, 21, 22, and 23 are joints made in the pipes 13 and 15 of the feeder 5 for the same purpose described of feeder 8.

A is a steam chest located on the framework over the feeders 6 and 7 and it is connected with them through the passages 24 and 25. This steam chest is connected with a steam drum 37 by means of a pipe 38, and the steam drum is connected with the boiler 4 by means of the pipe 37$^a$.

35 is a port in the steam chest which is connected to the water supply 3 by the pipe 36. This is for admitting exhaust steam from the chambers 6 and 7 into the water supply equalizing the pressure in these parts to avoid the opposition of flow of water to the feeders from said supply.

38 is a valve working in the steam chest A and it controls the admission of steam into the chambers 6 and 7 through the passages 24 and 25. This valve is operated by a rod 34 connected to one end of an elbow lever 30 which is pivoted on the framework at 32. The other end of the lever 30 is connected to the walking beam 27 by the link 31.

41 is a mud drum placed between the water supply and boiler. This is for catching and retaining all scum and sediment from the water from the supply. Such foreign matter can then be blown off through the cock at the bottom of the drum. The drum 41 is connected with the steam drum 37 by the pipe 51 which is provided with the cock 52 for preventing any reflux action from the mud drum.

46 is a reservoir for containing oil which may be contained in the water in the mud drum. This reservoir is supported by the pipe 45 extending from the mud drum and which is provided with the shoulder 49.

48 is a water glass connected with the reservoir 46 by the pipe 47, and 59 is a cock through which the oil is drawn off when a sufficient quantity indicated by the glass 48, is in the reservoir. The operation of this construction is as follows: The shoulder 49 on the pipe 45 causes a little eddy in the water in the mud drum, and any oil which may be contained in the water rises in the pipe 45 into the reservoir 46, from which, after a sufficient quantity of oil collects, it is drawn off through the cock 59.

The operation of my boiler feeder is as follows: The feeder 5 is drawn down by means of the spring 58, consequently drawing down the end of the walking beam and raising the other end, with the feeder 8. At the same time the elbow lever pulls the valve over and opens the passage 24 which forms a communication between the chambers 6 and 8 and the water supply, and the said valve also opens communication between the boiler and chambers 5 and 7 through the steam drum and steam chest, to equalize the pressure in these parts. The pressure in the chambers 6 and 8 and the water supply becoming equalized the water flows from the supply into the chamber 8, through pipes 9 and 56, and into chamber 8 through pipes 9 and 14. The water rushing into these chambers condenses the steam remaining therein, which condensation creates a vacuum which allows the water to flow into the chambers faster. The check valve 39 prevents any reflux from the chambers 6 and 8 to the water supply. In the meantime, chambers 5 and 7 have been emptied by the steam pressure therein forcing the water out, and the chamber 8 becoming filled with water, it slowly descends and raises the feeder 5. At the same time the feeder 5 is raised, the elbow lever pushes the valve over and opens passage 25 forming communication with the chambers 5 and 7 and the water supply, and also allows the steam from the boiler to enter chambers 6 and 8 through the passage 24. As the pressure becomes equalized in the chambers 5 and 7 and the water supply, the water flows into these chambers. The check valve 43 prevents any reflux from these chambers to the water supply. Thus the chambers are automatically and alternately filled and emptied, the water flowing from the pairs of chambers which are above the water level in the boiler, into the settling drum, and from there into the boiler. The check valves 40 and 44 prevent any reflux from said drum. The steam passing through pipe 37ª from the boiler draws up the scum and sediment from the boiler and conveys it to the steam drum 37 where it settles to the bottom and passes out through the pipe 51 to the drum 41 where it meets the stream of water from the supply. The steam and sediment being of higher temperature than the water, it becomes equalized and thus the foreign matter contained in the steam is precipitated to the bottom of the mud drum, from where it is blown off through a cock. Should the water rise above the water-line in the boiler, the end of steam pipe 37ª becomes closed and steam is shut off from the steam drum and chest, and feeding chambers. The chambers consequently cease acting until the water falls below the pipe, and steam is again admitted to the chest and chambers.

Having thus described my invention, what I claim as new therein, and desire to secure by Letters Patent, is—

1. In a water feeder for boilers, the combination of the boiler, the water supply, the feeding chambers having connections with the boiler and water supply, said feeding chambers being connected in pairs mounted on a suitable support, a walking beam mounted on said support, one chamber of each pair being connected to said walking beam, and a steam valve also connected with the walking beam for alternately forming communications between one pair of the feeding chambers with the water supply, while the other pair is connected with the boiler, substantially as and for the purpose set forth.

2. In a water feeder for boilers, the combination of the boiler, the water supply, the feeding chambers connected together in pairs, mounted on a suitable support, a walking beam on said support and connected to one chamber of each pair, suitable connections with the water supply and stationary feeding chambers, and flexible connections between the water supply and movable feeding chambers, a steam chest located on said frame and connected with the boiler and stationary chambers, a valve in said steam chest for alternately connecting the boiler with the stationary feeding chambers substantially as and for the purpose set forth.

3. In a water feeder for boilers, the combination of the boiler, the water supply, the feeding chambers mounted on a suitable support and connected together in pairs by jointed pipes, one chamber of each pair being adapted to rise and fall alternately, a walking beam on said support and connected with the movable chamber of each pair, suitable connections with the water supply and stationary chambers, and flexible connections between the water supply and movable chambers, a steam chest located on said support, having connection with the boiler and stationary chambers, and a valve located within said steam chest and connected with the walking beam, whereby as the movable chambers rise and fall, communication is alternately established between the feeding chamber, boiler and water supply, substantially as shown and described.

4. In a water feeder for boilers, the combination of the boiler, the water supply, the feeding chambers connected together in pairs, the frame on which the feeding chambers are supported the walking beam on said frame, and to which two of the feeding chambers are connected, the steam chest also located on said support and having connections between the boiler, water supply, steam chest and feeding chambers, and the mud drum located between the feeding chambers and boiler, substantially as shown and described.

JOSIAH AUSTIN.

Witnesses:
E. K. CAMPBELL,
NED CAMPBELL.